(12) United States Patent
Churchill et al.

(10) Patent No.: US 10,073,841 B2
(45) Date of Patent: *Sep. 11, 2018

(54) GENERATIVE GRAMMAR MODELS FOR EFFECTIVE PROMOTION AND ADVERTISING

(71) Applicant: eBay Inc., San Jose, CA (US)

(72) Inventors: Elizabeth Churchill, San Francisco, CA (US); Atish Das Sarma, Moutain View, CA (US); Corinne Elizabeth Sherman, San Jose, CA (US); Gyanit Singh, Fremont, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,060

(22) Filed: May 15, 2017

(65) Prior Publication Data

US 2017/0249302 A1 Aug. 31, 2017

Related U.S. Application Data

(63) Continuation of application No. 14/500,727, filed on Sep. 29, 2014, now Pat. No. 9,652,787.

(51) Int. Cl.
*G06F 17/28* (2006.01)
*H04L 12/58* (2006.01)
*G06Q 30/02* (2012.01)

(52) U.S. Cl.
CPC ..... *G06F 17/2881* (2013.01); *G06Q 30/0239* (2013.01); *G06Q 30/0276* (2013.01);
(Continued)

(58) Field of Classification Search
CPC .................................................. G06F 17/2881
(Continued)

(56) References Cited

U.S. PATENT DOCUMENTS 6,055,543 A 4/2000 Christensen et al.
6,067,552 A 5/2000 Yu
(Continued)

FOREIGN PATENT DOCUMENTS

WO WO-2015116583 A1 8/2015
WO WO-2016053860 A1 4/2016

OTHER PUBLICATIONS

"U.S. Appl. No. 13/972,580, Final Office Action dated Aug. 25, 2016", 16 pgs.
(Continued)

*Primary Examiner* — Susan McFadden
(74) *Attorney, Agent, or Firm* — Schwegman Lundberg & Woessner, P.A.

(57) ABSTRACT

A system comprising a computer-readable storage medium storing at least one program and a computer-implemented method for creating messages using generative grammar models is presented. Consistent with some embodiments, the method may include receiving a request to generate a message, which in an example embodiment is to be published to a social network platform. In response to receiving the request, a generative grammar model defining the structure of the message is accessed. The generative grammar model may include a number of blanks and may specify a source along with a grammatical constraint for a term to populate each blank. The method may further include generating the message in accordance with the generative grammar model, and causing the generated message to be published.

20 Claims, 8 Drawing Sheets

(52) U.S. Cl.
CPC ............ *H04L 51/066* (2013.01); *H04L 51/32* (2013.01); *H04L 51/38* (2013.01)

(58) Field of Classification Search
USPC .......................................................... 704/9
See application file for complete search history.

(56) References Cited

U.S. PATENT DOCUMENTS

| | | |
|---|---|---|
| 6,438,579 B1 | 8/2002 | Hosken |
| 6,574,635 B2 | 6/2003 | Stauber et al. |
| 7,089,278 B1 | 8/2006 | Churchill et al. |
| 7,669,123 B2 | 2/2010 | Zuckerberg et al. |
| 7,730,216 B1 | 6/2010 | Issa et al. |
| 7,912,701 B1 | 3/2011 | Gray et al. |
| 8,095,432 B1 | 1/2012 | Berman et al. |
| 8,171,128 B2 | 5/2012 | Zuckerberg et al. |
| 8,250,145 B2 | 8/2012 | Zuckerberg et al. |
| 8,429,630 B2 | 4/2013 | Nickolov et al. |
| 8,788,263 B1 | 7/2014 | Richfield |
| 8,793,255 B1 | 7/2014 | Bilinski et al. |
| 8,805,769 B2 | 8/2014 | Ritter et al. |
| 9,015,031 B2 | 4/2015 | Ferrucci et al. |
| 9,183,560 B2 | 11/2015 | Abelow |
| 9,189,965 B2 | 11/2015 | Singh et al. |
| 9,189,967 B2 | 11/2015 | Singh et al. |
| 9,286,397 B1 | 3/2016 | Suleman et al. |
| 9,652,787 B2 | 5/2017 | Churchill et al. |
| 2005/0198305 A1 | 9/2005 | Pezaris et al. |
| 2006/0178868 A1 | 8/2006 | Billerey-Mosier |
| 2006/0218153 A1 | 9/2006 | Voon et al. |
| 2006/0218225 A1 | 9/2006 | Hee Voon et al. |
| 2007/0043583 A1 | 2/2007 | Davulcu et al. |
| 2007/0282596 A1 | 12/2007 | Suzuki et al. |
| 2007/0288468 A1 | 12/2007 | Sundaresan et al. |
| 2008/0134052 A1 | 6/2008 | Davis et al. |
| 2008/0189169 A1 | 8/2008 | Turpin et al. |
| 2008/0189274 A1 | 8/2008 | Mann |
| 2009/0144392 A1 | 6/2009 | Wang et al. |
| 2009/0271289 A1 | 10/2009 | Klinger et al. |
| 2009/0288012 A1 | 11/2009 | Hertel et al. |
| 2010/0023506 A1 | 1/2010 | Sahni et al. |
| 2010/0076850 A1 | 3/2010 | Parekh et al. |
| 2010/0169152 A1 | 7/2010 | Maor et al. |
| 2010/0281364 A1 | 11/2010 | Sidman |
| 2010/0318571 A1 | 12/2010 | Pearlman et al. |
| 2011/0004692 A1 | 1/2011 | Occhino et al. |
| 2011/0145252 A1 | 6/2011 | Sundaresan et al. |
| 2011/0191417 A1 | 8/2011 | Rathod |
| 2011/0264528 A1 | 10/2011 | Whale |
| 2011/0320960 A1 | 12/2011 | Cai |
| 2012/0054646 A1 | 3/2012 | Hoomqani et al. |
| 2012/0084160 A1 | 4/2012 | Badros et al. |
| 2012/0084657 A1 | 4/2012 | Ranade et al. |
| 2012/0150598 A1 | 6/2012 | Griggs |
| 2012/0221439 A1 | 8/2012 | Sundaresan et al. |
| 2012/0253972 A1 | 10/2012 | Oskolkov et al. |
| 2012/0290448 A1 | 11/2012 | England et al. |
| 2012/0290553 A1 | 11/2012 | England et al. |
| 2012/0317109 A1 | 12/2012 | Richter et al. |
| 2013/0060870 A1 | 3/2013 | Webb et al. |
| 2013/0073388 A1 | 3/2013 | Heath |
| 2013/0073983 A1 | 3/2013 | Rasmussen et al. |
| 2013/0095864 A1 | 4/2013 | Marovets |
| 2013/0110803 A1 | 5/2013 | Mikalsen et al. |
| 2013/0159403 A1 | 6/2013 | Zigoris et al. |
| 2013/0227023 A1 | 8/2013 | Raichelgauz et al. |
| 2013/0238706 A1 | 9/2013 | Desai |
| 2013/0325966 A1 | 12/2013 | Tseng |
| 2013/0346172 A1 | 12/2013 | Wu |
| 2014/0006524 A1 | 1/2014 | Singh et al. |
| 2014/0013244 A1 | 1/2014 | Lindsay et al. |
| 2014/0025734 A1 | 1/2014 | Griffin |
| 2014/0025737 A1 | 1/2014 | Kruglick |
| 2014/0068692 A1 | 3/2014 | Archibong et al. |
| 2014/0143228 A1 | 5/2014 | Blue et al. |
| 2014/0189027 A1 | 7/2014 | Zhang et al. |
| 2014/0278998 A1 | 9/2014 | Systrom et al. |
| 2014/0279068 A1 | 9/2014 | Systrom et al. |
| 2014/0279184 A1 | 9/2014 | Lai et al. |
| 2014/0297618 A1 | 10/2014 | Sherman |
| 2015/0169571 A1 | 6/2015 | Farago et al. |
| 2015/0215349 A1 | 7/2015 | Sherman |
| 2015/0341304 A1 | 11/2015 | Sherman et al. |
| 2016/0092426 A1 | 3/2016 | Churchill et al. |

OTHER PUBLICATIONS

"U.S. Appl. No. 13/972,580, Final Office Action dated Dec. 9, 2015", 16 pgs.

"U.S. Appl. No. 13/972,580, Non Final Office Action dated Jun. 4, 2015", 18 pgs.

"U.S. Appl. No. 13/972,580, Response filed Feb. 17, 2016 to Final Office Action dated Dec. 9, 2015", 11 pgs.

"U.S. Appl. No. 13/972,580, Response filed Oct. 5, 2015 to Non Final Office Action dated Jun. 4, 2015", 13 pgs.

"U.S. Appl. No. 14/167,715, Examiner Interview Summary dated Sep. 30, 2016", 4 pgs.

"U.S. Appl. No. 14/167,715, Final Office Action dated May 1, 2017", 31 pgs.

"U.S. Appl. No. 14/167,715, Non Final Office Action dated Jun. 28, 2016", 30 pgs.

"U.S. Appl. No. 14/167,715, Notice of Non-Compliant Amendment dated Nov. 30, 2016", 2 pgs.

"U.S. Appl. No. 14/167,715, Response filed Sep. 28, 2016 to Non Final Office Action dated Jun. 28, 2016", 26 pgs.

"U.S. Appl. No. 14/285,211, Examiner Interview Summary dated Jul. 28, 2016", 3 pgs.

"U.S. Appl. No. 14/285,211, Examiner Interview Summary dated Dec. 16, 2016", 3 pgs.

"U.S. Appl. No. 14/285,211, Final Office Action dated Sep. 13, 2016", 16 pgs.

"U.S. Appl. No. 14/285,211, Non Final Office Action dated Feb. 26, 2016", 24 pgs.

"U.S. Appl. No. 14/285,211, Non Final Office Action dated Apr. 3, 2017", 15 pgs.

"U.S. Appl. No. 14/285,211, Response filed Jul. 22, 2016 to Non Final Office Action dated Feb. 26, 2016", 18 pgs.

"U.S. Appl. No. 14/285,211, Response filed Dec. 13, 2016 to Final Office Action dated Sep. 13, 2016", 12 pgs.

"U.S. Appl. No. 14/500,727, Examiner Interview Summary dated Aug. 2, 2016", 2 pgs.

"U.S. Appl. No. 14/500,727, First Action Interview—Office Action Summary dated Sep. 30, 2016", 19 pgs.

"U.S. Appl. No. 14/500,727, First Action Interview-Pre-Interview Communication dated May 24, 2016", 4 pgs.

"U.S. Appl. No. 14/500,727, Notice of Allowance dated Jan. 10, 2017", 6 pgs.

"U.S. Appl. No. 14/500,727, Response Filed Jul. 19, 2016 to First Action Interview-Pre-Interview Communication dated May 24, 2016", 2 pgs.

"U.S. Appl. No. 14/500,727, Response filed Oct. 15, 2016 to First Action Interview-Office Action Summary dated Sep. 30, 2016", 11 pgs.

"U.S. Appl. No. 14/167,715, Response filed Jan. 24, 2017 to Notice of Non-Compliant Amendment dated Nov. 30, 2016", 26 pgs.

"International Application Serial No. PCT/US2015/013070, International Preliminary Report on Patentability dated Aug. 11, 2016", 7 pgs.

"International Application Serial No. PCT/US2015/013070, International Search Report dated Apr. 13, 2015", 2 pgs.

"International Application Serial No. PCT/US2015/013070, Written Opinion dated Apr. 13, 2015", 5 pgs.

"International Application Serial No. PCT/US2015/052620, International Preliminary Report on Patentability dated Apr. 13, 2017", 7 pgs.

"International Application Serial No. PCT/US2015/052620, International Search Report dated Dec. 28, 2015", 2 pgs.

(56) References Cited

OTHER PUBLICATIONS

"International Application Serial No. PCT/US2015/052620, Written Opinion dated Dec. 28, 2015", 10 pgs.
"Microsoft Computer Dictionary", 5th Edition, Microsoft Press, Redmond, WA, (2002), 7 pgs.
"Widget (GUI)", [Online] retrieved from the internet: <en.wikipedia.org/wiki/Widget_(GUI)>, (2016), 5 pgs.
Abel, Fabian, et al., "Semantic Enrichment of Twitter Posts for User Profile Construction on the Social Web", Springer-Verlag, Berlin, Germany, (2011), 375-389.
Adams, Paige H, et al., "Topic Detection and Extraction in Chat", Santa Clara, CA, (2008), 581-588.
Carmel, David, et al., "Personalized Social Search Based on the User's Social Network", CIKM'09, (Nov. 2-6, 2009), 1227-1236.
Chen, Kailong, et al., "Collaborative Personalized Tweet Recommendation", Portland, (Aug. 12-16, 2012), 661-670.
Gou, Liang, et al., "SFViz: Interest-based Friends Exploration and Recommendation", (Aug. 4-5, 2011), 10 pgs.
Gursel, Anil, et al., "Producing Timely Recommendations From Social Networks Through Targeted Search", AAMAS—8th International Conference. Budapest, Hungary, (2009), 805-812.
Guy, Ido, et al., "Social Media Recommendation based on People and Tags", Geneva, Switzerland, (Jul. 19-23, 2010), 194-201.
Kinsella, Sheila, et al., "Using Hyperlinks to Enrich Message Board Content with Linked Data", I-Semantics 2010, (2010), 1-9.
Leitner, Peter, et al., "Collaborative Shopping Networks: Sharing the Wisdom of Crowds in E-Commerce Environments", Bled Proceedings, (2008), 16 pgs.
Marlow, Cameron, et al., "HT06, Tagging Paper, Taxonomy, Flickr, Academic Article, To Read", Odense, Denmark, (Aug. 22-25, 2006), 31-39.
Milicevic, Aleksandra, et al., "Social Tagging in recommender systems: a survey of the state-of-the-art and possible extensions", Springer, (2010), 187-209.
Naaman, Mor, "Social multimedia: highlighting opportunities for search and mining of multimedia data in social media applications", Multimed Tools Appl., vol. 56, (2011), 9-34.
Nanopoulos, Alexandras, "Item Recommendation in Collaborative Tagging Systems", IEEE Transactions on Systems, (2011), 760-771.
"U.S. Appl. No. 14/167,715, Response filed Aug. 1, 2017 to Final Office Action dated May 1, 2017", 15 pgs.
"U.S. Appl. No. 14/285,211, Response filed Jul. 3, 2017 to Non Final Office Action dated Apr. 3, 2017", 11 pgs.
"European Application Serial No. 15846905.6, Response to Office Action dated Jun. 7, 2017", 12 pgs.
Response to Final Office Action filed on Jan. 3, 2018 for U.S. Appl. No. 14/285,211, dated Nov. 3, 2017, 11 pages.
Response to Non-Final Office Action filed on Feb. 5, 2018 for U.S. Appl. No. 14/167,715, dated Sep. 5, 2017, 14 pages.
Non-Final Office Action received for U.S. Appl. No. 14/167,715, dated Sep. 5, 2017, 29 pages.
Response to First Examiner's Report filed on Jan. 24, 2018, for Australian Patent Application No. 2015324168, dated Nov. 21, 2017, 21 pages.
Examination Report Received for Australian patent Application No. 2015324168, dated Nov. 21, 2017, 3 pages.
Office Action received for Canadian Application No. 2,961,281, dated Jan. 18, 2018, 4 pages.
Ehud, "20 Natural Language Generation", Retrieved From Internet <http://www.blackwellreference.com/public/tocnode?id=g9781405155816_chunk_g978140515581621>, Aug. 31, 2010, pp. 574-598.
Extended European Search Report received for European Patent Application No. 15846905.6, dated Feb. 26, 2018, 9 pages.
Final Office Action received for U.S. Appl. No. 14/285,211, dated Nov. 3, 2017, 15 pages.
Final Office Action received for U.S. Appl. No. 14/167,715, dated Mar. 16, 2018, 23 pages.
Response to Office Action filed on Mar. 26, 2018 for Canadian Patent Application No. 2,961,281, dated Jan. 18, 2018, 24 pages.
Advisory Action received for U.S. Appl. No. 14/285,211, dated Jan. 26, 2018, 3 pages.
Amendment filed for Korean Patent Application No. 10-2017-7011547 dated Jun. 1, 2018, 18 pages (14 pages of Official copy and 4 pages of English Pending Claims).
Non-Final Office Action received for U.S. Appl. No. 14/285,211, dated Jun. 27, 2018, 18 pages.
Advisory Action received for U.S. Appl. No. 14/167,715, dated Jul. 13, 2018, 6 pages.
Response to Final Office Action filed on Jun. 18, 2018, for U.S. Appl. No. 14/167,715, dated Mar. 16, 2018, 18 pages.

US 10,073,841 B2

GENERATIVE GRAMMAR MODELS FOR EFFECTIVE PROMOTION AND ADVERTISING

PRIORITY CLAIM

This application is a continuation of and claims the benefit of priority to U.S. patent application Ser. No. 14/500,727, filed on Sep. 24, 2014, entitled "GENERATIVE GRAMMAR MODELS FOR EFFECTIVE PROMOTION AND ADVERTISING," which is hereby incorporated by reference.

TECHNICAL FIELD

This application relates to data processing. In particular, example embodiments may relate to generative grammar models for effective social promotion and advertising.

BACKGROUND

Social network platforms (e.g., Facebook®, Twitter®, Pinterest®, or the like) provide users with the ability to post and share content (e.g., user generated content or existing third party content) with members of their social network. Users of these social network platforms often spend considerable time and effort attempting to formulate appropriate messages to append to content that is to be shared. Considering the amount of such content that is regularly shared on social networks, it is often difficult to share the content in a manner that will be engaging to the audience. As a result, a large amount of shared content goes unnoticed.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
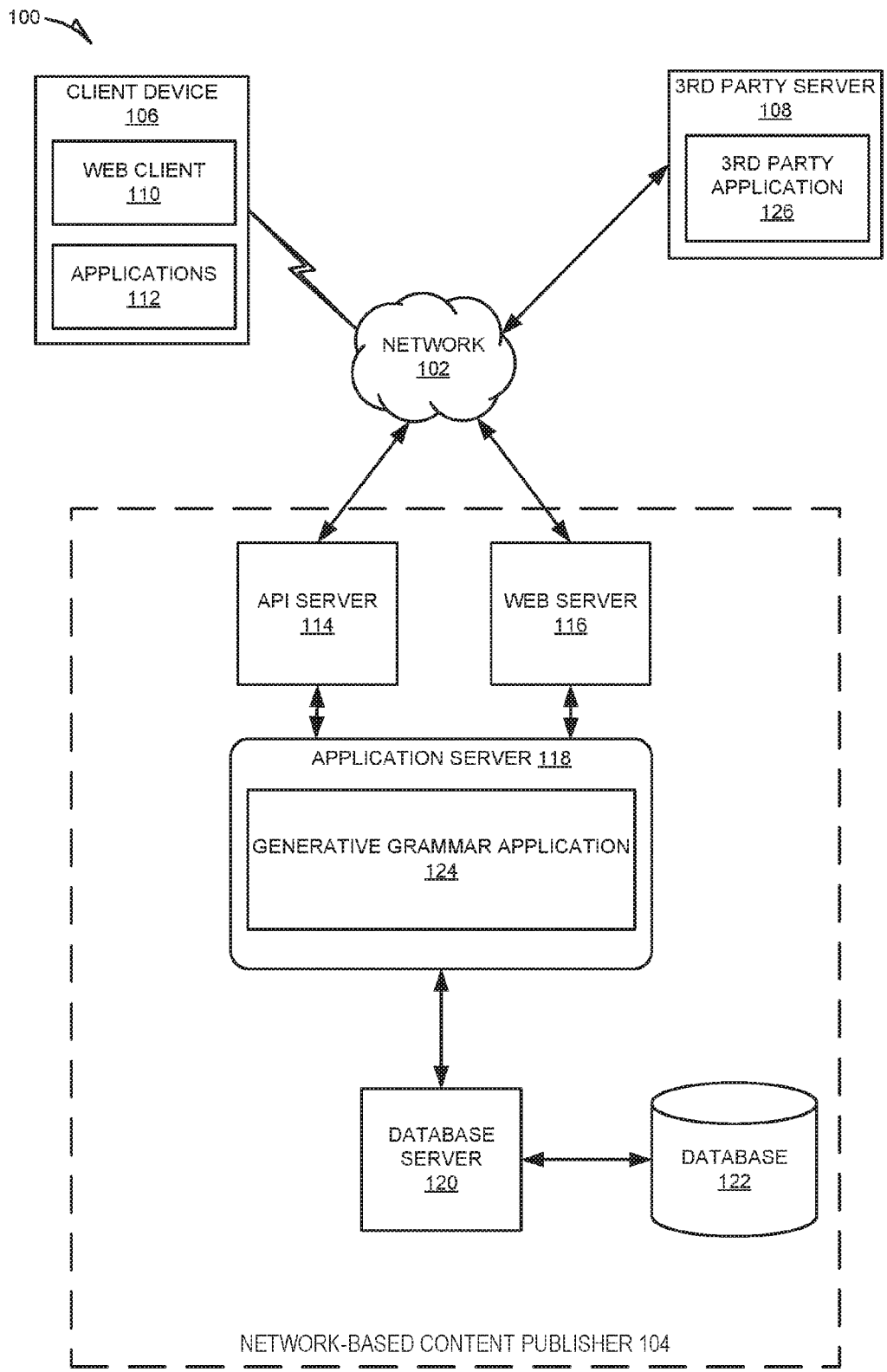
FIG. 1 is a network diagram depicting a network system having a client-server architecture configured for exchanging data over a network with a content publisher, according to an example embodiment.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve systems and methods for automatic generation of content by suitably combining selections from various types of information. The generated content may, for example, be published as an entry (e.g., status updates, tweets, pins, and other such messages) on one or more social network platforms, and in example embodiments, may be used to share, advertise, or promote other existing content such as listings for products offered for sale (e.g., in an online marketplace). Information used to generate content may be retrieved from a variety of different sources that may be stored in either internal or external (e.g., third party) repositories. The information may, for example, include general product information (e.g., item categories), specific product information (e.g., brands), information about the user intending to share the content (e.g., demographic data), or information about the intended audience of the shared content (e.g., social data). In this manner, the methods described in example embodiments may achieve the technical effect of maximizing automatic relevant content generation while minimizing user effort, maximizing content appeal, and thus, maximizing the overall effectiveness of shared content.

Example embodiments involve the use of generative grammar models in the generation of messages, which may be included as part of published social network entries. Individual generative grammar models define the structure of a message (e.g., a phrase or sentence) to be published. The generative grammar model may specify a number of lexical slots, which are blanks that are to be filled with information to eventually form the message. For each lexical slot, the generative grammar model specifies a corpus of source data and a grammatical constraint. The corpus of source data is a discrete source of information used to fill the lexical slot, and the grammatical constraint specifies a type of speech from which a particular term (e.g., word or phrase) used to fill the lexical slot is to be selected. For example, the grammatical constraint may specify a lexical category (e.g., noun, verb, or adjective). The particular generative grammar model selected to generate messages may, for example, be specifically designed for the social network platform to which the message is being shared, a type of content or item associated with the message (e.g., a product listing), or the user requesting to publish the message.

FIG. 1 is a network diagram depicting a network system 100, according to one embodiment, having a client-server architecture configured for exchanging data over a network 102. While the network system 100 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 1. Moreover, it shall be appreciated that although the various functional components of the network system 100 are discussed in the singular sense, multiple instances of any one of the various functional components may be employed.

The network system 100 may include a network-based content publisher 104 in communication with a client device 106 and a third party server 108. In some example embodiments, the network-based content publisher 104 may be a network-based marketplace (e.g., eBay.com). The network-based content publisher 104 may communicate and exchange data within the network system 100 that may pertain to various functions and aspects associated with the network system 100 and its users. The network-based content publisher 104 may provide server-side functionality, via a network 102 (e.g., the Internet), to network devices such as the client device 106.

The client device 106 may be operated by users who use the network system 100 to exchange data over the network 102. These data exchanges may include transmitting, receiving (communicating), and processing data to, from, and regarding content and users of the network system 100. The data may include, but are not limited to, images; video or audio content; user preferences; product and service feedback, advice, and reviews; product, service, manufacturer, and vendor recommendations and identifiers; product and service listings associated with buyers and sellers; product and service advertisements; auction bids; transaction data; user profile data; and social data, among other things.

The client device 106 may interface with the network-based content publisher 104 via a connection with the network 102. Depending on the form of the client device 106, any of a variety of types of connections and networks 102 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 102 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 102 may be a Wireless Fidelity (Wi-Fi, IEEE 802.11x type) connection, a Worldwide Interoperability for Microwave Access (WiMAX) connection, or another type of wireless data connection. In such an embodiment, the network 102 may include one or more wireless access points coupled to a local area network (LAN), a wide area network (WAN), the Internet, or another packet-switched data network. In yet another example, the connection to the network 102 may be a wired connection (e.g., an Ethernet link), and the network 102 may be a LAN, a WAN, the Internet, or another packet-switched data network. Accordingly, a variety of different configurations are expressly contemplated.

In various embodiments, the data exchanged within the network system 100 may be dependent upon user-selected functions available through one or more client or user interfaces (UIs). The UIs may be associated with a client device, such as the client device 106 executing a web client 110 (e.g., an Internet browser), which may be in communication with the network-based content publisher 104. The UIs may also be associated with one or more applications 112 executing on the client device 106, such as a mobile application designed for interacting with the network-based content publisher 104 or with a social network platform hosted by the third party server 108.

Turning specifically to the network-based content publisher 104, an API server 114 and a web server 116 are coupled to, and provide programmatic and web interfaces respectively to, an application server 118. As illustrated in FIG. 1, the application server 118 may be coupled via the API server 114 and the web server 116 to the network 102, for example, via wired or wireless interfaces. The application server 118 is, in turn, shown to be coupled to a database server 120 that facilitates access to a database 122. In some examples, the application server 118 can access the database 122 directly without the need for the database server 120. The database 122 may include multiple databases that may be internal or external to the network-based content publisher 104.

The application server 118 may, for example, host one or more applications, which may provide a number of content publishing and viewing functions and services to users who access the network-based content publisher 104. For example, the network-based content publisher 104 may host a marketplace application that provides a number of marketplace functions and services to users, such as publishing, listing, and price-setting mechanisms whereby a seller may list (or publish information concerning) goods or services (also collectively referred to as "products") for sale, a buyer can express interest in or indicate a desire to purchase such goods or services, and a price can be set for a transaction pertaining to the goods or services.

As illustrated in FIG. 1, the application server 118 hosts a generative grammar application 124 that provides message generation and publishing services to users of the network-based content publisher 104. For example, the generative grammar application 124 may receive requests from a user to share a product listing with one or more other users, and in turn, the generative grammar application 124 may generate and facilitate the publishing of a message to share the product listing. The generative grammar application 124 may cause the messages to be "published" in the sense that they are communicated, albeit through a variety of means, to other users or entities.

The messages generated and published by the generative grammar application 124 may also include a reference to content (e.g., a link). As used herein, the terms "content" or "content item" refer to electronic data that is consumed by viewers (e.g., users) on displays, client devices, or page/display-based media (e.g., World-Wide Web (WWW) media embodied in browsers and accessible over the Internet). As such, the terms "content" and "content item" may refer to data associated with readable text, data associated with images, data associate with graphics or video, programmatic content, scripts, or data corresponding to various combinations of these.

Consistent with some embodiments, users may utilize the generative grammar application 124 to generate messages that are separate from and independent of any existing content. For example, users may utilize the generative grammar application 124 to automatically generate a status update. Further, while the generative grammar application 124 is shown in FIG. 1 to form part of the network-based content publisher 104, it will be appreciated that, in alternative embodiments, the generative grammar application 124 may form part of a service that is separate and distinct from the network-based content publisher 104.

The database 122 may comprise a number of repositories used to store data pertaining to various functions and aspects associated with the network system 100 and its users. For example, the database 122 may include a repository to store and maintain user profiles for users of the network-based content publisher 104. Each user profile may comprise user profile data that describes aspects of a particular user. The user profile data may, for example, include demographic data, user preferences, social data, and financial information. The demographic data may, for example, include information describing one or more characteristics of a user such as gender, age, location information (e.g., hometown or current location), employment history, education history, contact information, familial relations, or user interests. The financial information may, for example, include private financial information of the user such as account number, credential, password, device identifier, user name, phone number, credit card information, bank information, transaction history, or other financial information which may be used to facilitate online transactions by the user.

The database 122 may also include a repository to store a record of user activity data. Accordingly, the network-based content publisher 104 may monitor, track, and record the activities of users utilizing one or more devices (e.g., the client device 106) to interact with the various components of the network system 100. Each user session may be maintained in a repository stored in the database 122. Accordingly, the user activity data may include past keyword searches that users have performed, web pages viewed by each user, products added to a user wish list or watch list, products added to an electronic shopping cart, and products that the users own. Consistent with some embodiments, the repository used to store records of user activity may be linked to the repository used to store user profile data so as to maintain an association of a user profile with the activities that the corresponding user has performed.

In instances in which the network-based content publisher 104 is a network-based marketplace, the database 122 may include a repository to store product information. Such product information may, for example, include a product identifier (e.g., a title or a model number), a price, a make, a manufacturer, a model, a brand name, a textual description, a size, a style, product dimensions, compatibility information, or any other information that may be used to describe a product. In these instances, the database 122 may also include a repository to store a transaction history of users of the network-based content publisher 104 that includes information related to transactions for products that may be offered for sale by merchants who utilize marketplace services provided by the network-based content publisher 104. The transaction history information may, for example, include a description of a product offered for sale, sold, or purchased by users, an identifier of the product, a category to which the product belongs, a purchase price, a purchase date, a purchased quantity, a number of bids for the product, or various combinations thereof.

FIG. 1 also illustrates a third party application 126 executing on the third party server 108 that may offer information or services to the application server 118 or to users of the client device 106. The third party application 126 may have programmatic access to the network-based content publisher 104 via a programmatic interface provided by the API server 114. The third party application 126 may be associated with any organization that may conduct transactions with or provide services to the application server 118 or to users of the client device 106. For example, the third party application 126 may be associated with a network based social network platform (e.g., Facebook®, Twitter®, Google+®, Pinterest®, LinkedIn®, or the like) that may provide a platform for members to build and maintain social networks and relations among members.

Figure 2:
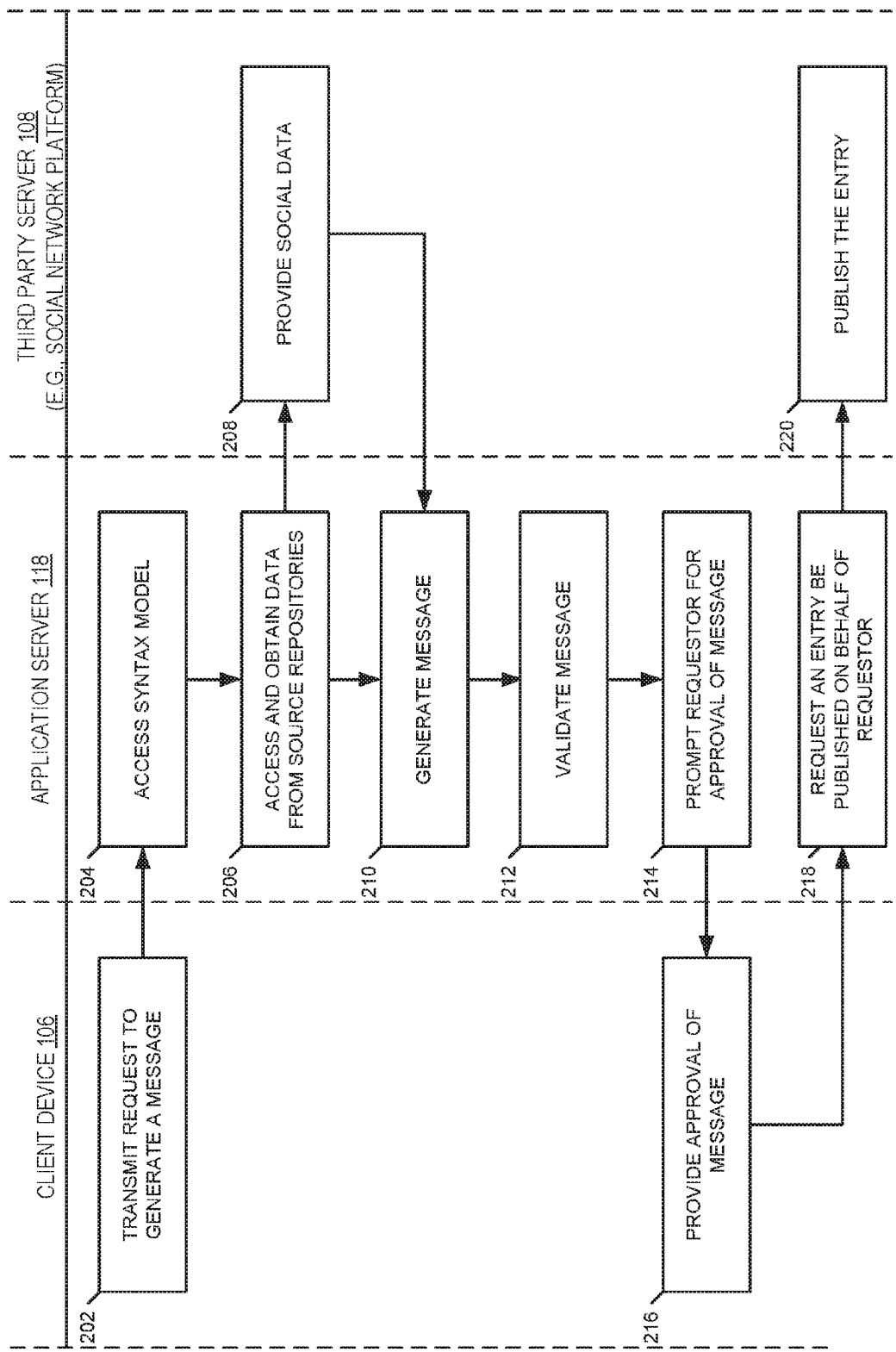
FIG. 2 is an interaction diagram depicting example exchanges between a client device, an application server, and a third party server, consistent with some embodiments.

FIG. 2 is an interaction diagram depicting example exchanges between a client device, an application server, and a third party server, consistent with some embodiments. In particular, FIG. 2 depicts example exchanges between the client device 106, the application server 118, and the third party server 108, which, in this example embodiment, corresponds to a social network platform. As shown, at operation 202, the client device 106 (the user of which is referred to as the "requesting user" or "requestor") transmits a request to generate a message, which in this example is to be published as an entry (e.g., an activity feed post, a wall post, a status update, a tweet, or a pin) on a social network platform.

In some embodiments, the submission of the request may be via a share widget embedded in a web page (e.g., hosted by the network-based content publisher 104) along with existing content. In such instances, the request may be more specifically to generate a message to share the content with members of a social network of the user (e.g., the recipients) maintained by the social network platform executing on the third party server 108.

It shall be appreciated that the share widget is merely an example of a graphical user interface (GUI) element at which user requests to generate a message may be received, and in other embodiments, user requests to generate messages may be received at various other GUI elements, or from various other applications executing within the network system 100 (e.g., applications executing on the application server 118 or the third party server 108) that are independent of any existing content. For example, a request to generate a message may be received from a social network application executing on the client device 106 and the transmission of the request may be in response to the user of the client device 106 selecting or otherwise manipulating a GUI element utilized for publishing content on the social network platform (e.g., a status update button).

In response to receiving the request, the application server 118 accesses a generative grammar model (e.g., stored in the database 122) defining a message structure at operation 204. The generative grammar model specifies a length of the message (e.g., a number of terms in the message) and a number of lexical slots. The lexical slots are blanks in a message structure that are to be filled with a term (e.g., a word or a phrase). In some embodiments, the generative grammar model may define one or more prepopulated or fixed terms to increase the readability and coherency of an eventual message created using the generative grammar model. For each lexical slot, the generative grammar model also specifies a corpus of source data and a grammatical constraint. The source data is a source of discrete information from which the term used to fill the lexical slot is to be selected. The grammatical constraint specifies a type of speech (e.g., call to action, noun, verb, adjective) to which the selected term belongs. The particular generative grammar model selected by the application server 118 may, for example, be specifically designed for use with the social network platform to which the message is being shared, a type of content or item associated with the message (e.g., a product listing), or the user requesting to publish the message.

At operation 206, the application server 118 accesses and obtains the corpus of source data specified for each lexical slot in the generative grammar model. Consistent with some embodiments, each corpus of source data may be stored in a discrete database or other such data repository, while in other embodiments, all corpuses of source data may be stored together in a single database or other such data repository with each corpus of source data being discretely indexed. The source data may include internal corpuses of user profile data, product information, transaction information, and user activity data maintained in the database 122 as well as other corpuses of data maintained by third party systems that are external to the network-based content publisher 104. For example, in the embodiment illustrated in FIG. 2, the generative grammar model specifies social data maintained by the social network platform as the source data for one of the lexical slots in the generative grammar model. In instances in which a source repository is external to the network-based content publisher 104, the application server 118 may transmit a request (e.g., an API call) to the third party system to request the source data.

In response to receiving such a request, the third party server 108 provides the social data to the application server 118 at operation 208. The term "social data" refers to information maintained by a social network platform about its members. The social data of each member may contain information such as demographic information (e.g., gender, age, relationship status, employment status and history, household size), geographic information (e.g., a hometown, a current location, locations visited), interests and affinities (e.g., items the member "liked"), a list of social network connections, and a history of social network activity of the user. For purposes of the present disclosure, a social network "connection," also referred to as being "connected" on a social network, may include situations in which there is a reciprocal agreement between members of the social network to be linked on the social network, as well as situations in which there is only a singular acknowledgement of the "connection" without further action being taken by the other member. In the reciprocal agreement situation, both members of the "connection" acknowledge the establishment of the connection (e.g., friends). Similarly, in the singular acknowledgement situation, a member may elect to "follow" or "watch" another member. In contrast to the reciprocal agreement, the concept of "following" another member typically is a unilateral operation because it may not call for acknowledgement or approval by the member who is being followed.

For purposes of the present disclosure, "social network activity" collectively refers to user interactions (e.g., creating, sharing, viewing, commenting, providing feedback, or expressing interest) with entries (e.g., text and image posts, links, messages, notes, invitations). Such social network activity may involve entries that are intended for the public at large as well as entries intended for a particular social network connection or group of social network connections. Depending on the social network platform, the social network activity may be published in an entry and may involve entries such as an activity feed post, a wall post, a status update, a tweet, a pinup, a like, a content share (e.g., content shared from a source such as the network-based content publisher 104), or a check-in.

At operation 210, the application server 118 generates the message using the various source data and the generative grammar model. The generation of the message may include selecting a term from the source data of each respective lexical slot in the generative grammar model and populating the respective lexical slot with the corresponding selected term. Each of the terms is selected from respective corpuses of source data in accordance with the grammatical constraint specified for each lexical slot by the generative grammar model.

Figure 3:
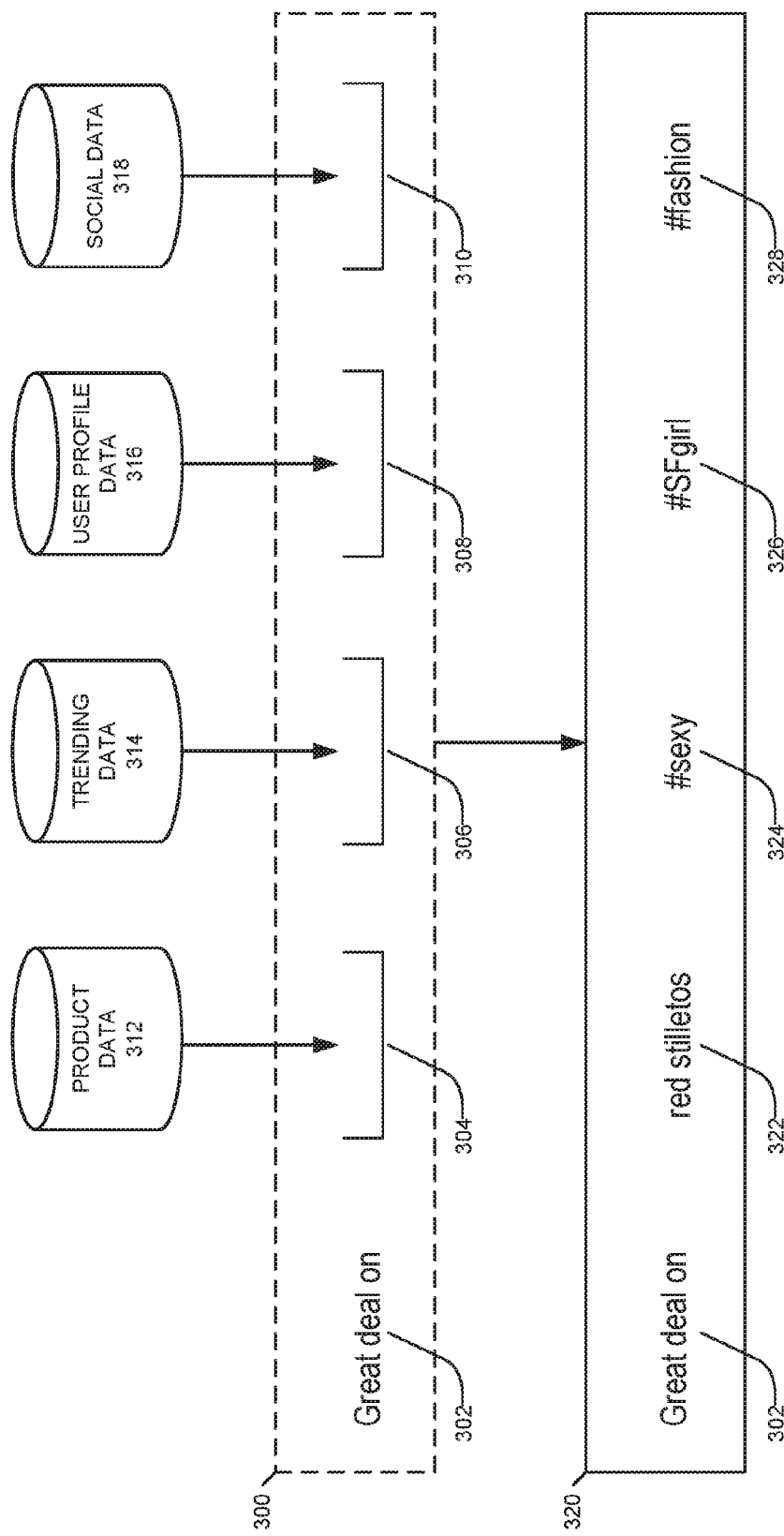
FIG. 3 is a data flow diagram depicting source data being used to populate an example generative grammar model, consistent with some embodiments.

As an example, FIG. 3 is a data flow diagram depicting source data being used to populate an example generative grammar model 300, consistent with some embodiments. The generative grammar model 300 defines a message structure including a prepopulated term 302 and lexical slots 304, 306, 308, and 310. As shown, the lexical slots 304, 306, 308, and 310 are each populated with a term from a distinct corpus of source data, which is specified by the generative grammar model 300, to create a message 320. In particular, product data 312 is specified as the source data for the lexical slot 304, trending data 314 (e.g., top trending hashtags on Twitter) is specified as the source data for the lexical slot 306, user profile data 316 is specified as the source data for the lexical slot 308, and social data 318 is specified as the source data for the lexical slot 310. As shown, the message 320 includes the prepopulated term 302, and terms 322, 324, 326, and 328. The terms 322, 324, 326, and 328 are selected and extracted, respectively, from the product data 312, the trending data 314, the user profile data 316, and the social data 318 in accordance with a grammatical constraint specified by the generative grammar model 300 for each of the lexical slots 304, 306, 308, and 310. For example, the grammatical constraint specified by the generative grammar model 300 for the lexical slot 306 is an adjective, and thus, the selected term 324 is an adjective.

FIG. 3 also illustrates a portion of the terms (e.g., terms 324, 326, and 328) comprising the message 320 as including an appended octothorpe (one of ordinary skill in the art may also refer to this symbol as a "hash" or "pound sign"), which, together with the appended term, forms a "hashtag." Hashtags may be used by search engines, social network services, content providers, online merchants, or other entities to index, identify, and distribute content. Accordingly, in some instances, the population of lexical slots with terms selected from source data may include appending the octothorpe to the term prior to insertion into the lexical slot. In some instances, extracted terms may, themselves, be hashtags. In this manner, the message 320 may include a number of hashtags that may be used to broadcast the message 320 to a potentially broader audience than if the terms were simply plain text (e.g., the term 322).

Returning to FIG. 2, at operation 212, the application server 118 validates the generated message (e.g., the message 320). The validating of the message may include performing various validation routines to ensure that the generated message is understandable, logical, and consistent. In some embodiments, the validation of the message may include verifying that the generated message adheres to a messaging standard or constraint (e.g., related to length or content) imposed by the social network platform to which the message is to be published. For example, messages published to Twitter® must be no longer than 140 characters, and in instances in which the message is to be published to Twitter®, as specified in the request received at operation 202, the application server 118 may verify that the generated message is no longer than 140 characters.

At operation 214, the application server 118 may prompt the requestor for approval of the generated message (e.g., by providing instructions to the client device 106 to present an interface to display the message and receive input from the requestor). At operation 216, the requestor may provide approval of the message by providing input via a button or other graphical interface element presented on the client device 106, which in turn transmits the approval to the application server 118. Upon receiving approval from the requestor, the application server 118 may transmit a request to the social network platform to publish the message as a social network entry on behalf of the requestor at operation 218. In instances in which the request to generate the message corresponds to a request to share content (e.g., via a share widget) with recipients, the application server 118 may include a link or other reference to the content along with the generated message to include in the published social network entry. At operation 220, the social network platform publishes the social network entry on behalf of the requestor.

Figure 4:
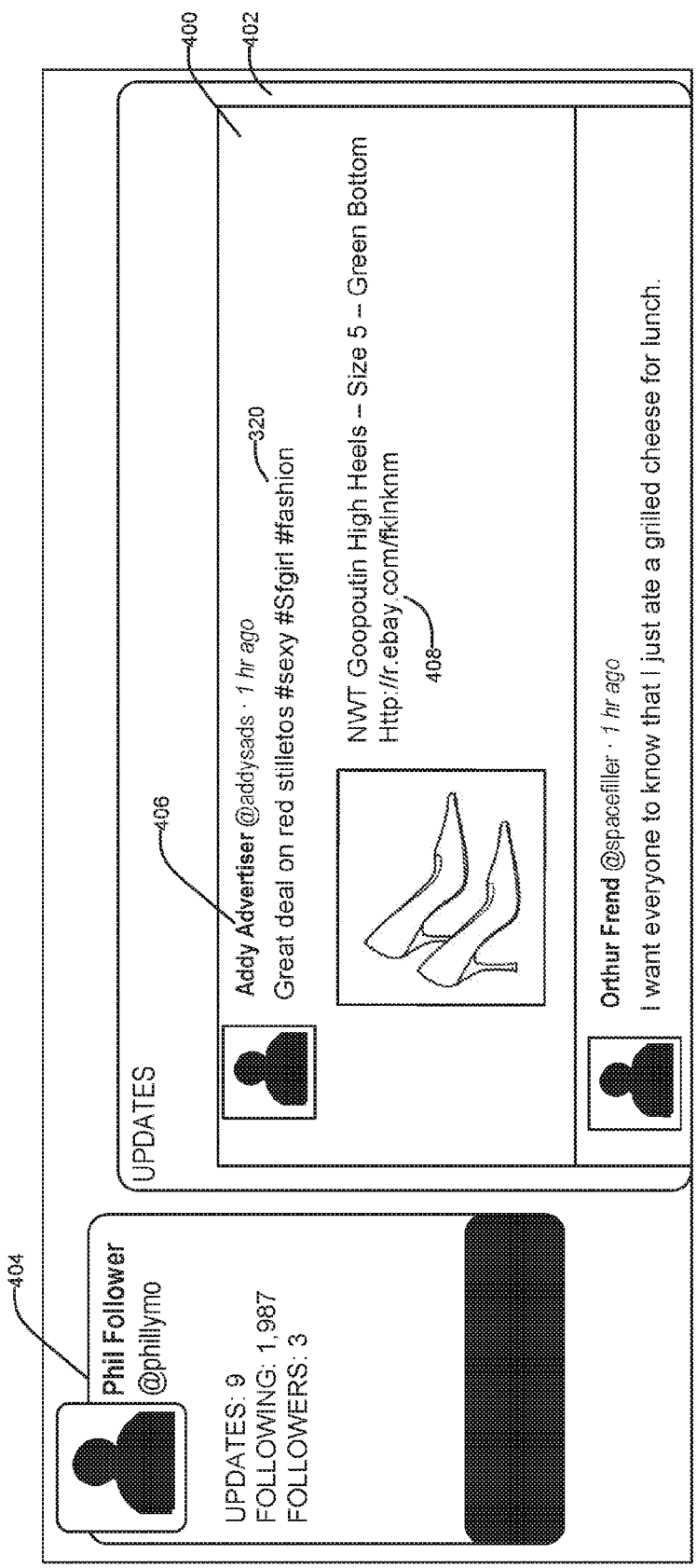
FIG. 4 is an interface diagram illustrating a published social network entry appearing on an example social network activity feed, consistent with some embodiments.

Upon being published by the social network platform, the social network entry comprising the message, and in some embodiments, a link to content may be viewed by the members of the social network of the requestor. For example, FIG. 4 is an interface diagram illustrating a published social network entry 400 appearing on an example social network activity feed 402, consistent with some embodiments. The social network activity feed 402 illustrated in FIG. 4 corresponds to a user profile 404, which in this embodiment corresponds to a user that is a social network connection of a requesting user 406 or who has otherwise been permitted to view the social network activity of the requesting user 406. The requesting user 406, on whose behalf the social network entry 400 is being published, is identified in the social network entry 400 by name (e.g., "Addy Advertiser") and by an image. The social network entry 400, as shown, includes the message 320 along with a content reference 408 (e.g., a link).

Figure 5:
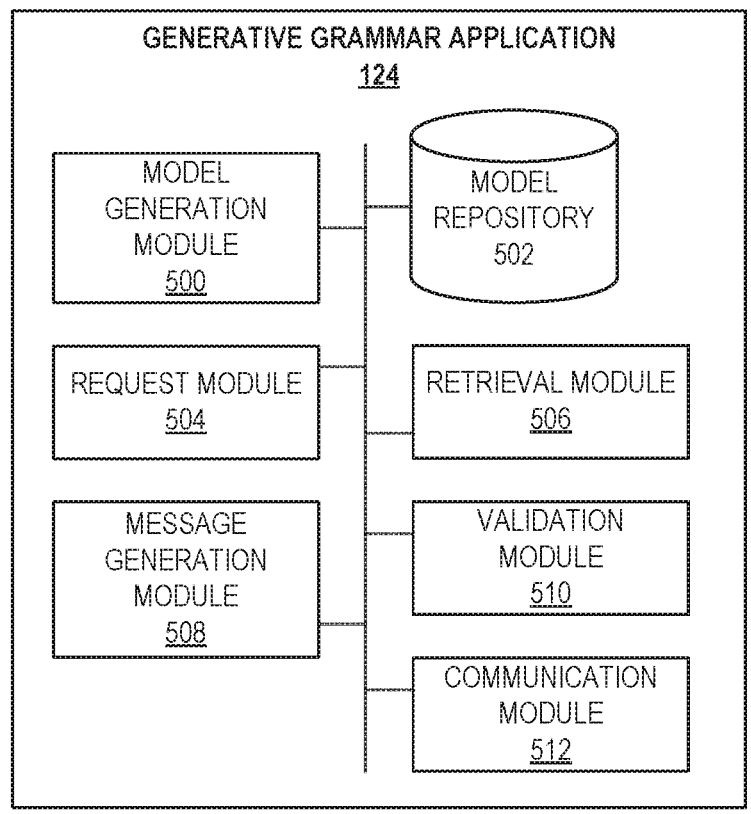
FIG. 5 is a block diagram illustrating various functional modules of a generative grammar application, which is provided as part of the network system, consistent with some embodiments.

FIG. 5 is a block diagram illustrating various functional modules of a generative grammar application 124, which is provided as part of the network system 100, consistent with some embodiments. The generative grammar application 124 is shown as including a model generation module 500, a model repository 502, a request module 504, a retrieval module 506, a message generation module 508, a validation module 510, and a communication module 512, all configured to communicate with each other (e.g., via a bus, shared memory, a switch, or application programming interfaces (APIs)). The various modules of the generative grammar application 124 may, furthermore, access the databases 122 via the database servers 120, and each of the various modules of the generative grammar application 124 may be in communication with one or more of the third party applications 126 (e.g., a social network platform). Further, while the modules of FIG. 5 are discussed in the singular sense, it will be appreciated that in other embodiments multiple modules may be employed.

The model generation module 500 is responsible for generating generative grammar models to be used in the automated generating of messages. Consistent with some embodiments, the model generation module 500 may develop generative grammar models for use in creating messages for publishing to a particular platform (e.g., a social network platform). To this end, the model generation module 500 may analyze a collection of social network activity obtained from a particular social network platform to identify patterns that are indicative of a typical messaging style of messages published to that social network platform. In other words, the model generation module 500 may analyze historic activity from a social network platform to learn a generic average of messages posted to that platform. The model generation module 500 may then use this information along with any constraints or limitations imposed by the social network platform (e.g., Twitter's® 140 character limit) to develop a generative grammar model operable to create messages in the typical messaging style of the social network platform. For example, upon analyzing social network activity from Facebook®, the model generation module 500 may determine that users of Facebook® typically use full grammatically correct sentences when posting messages, and in turn, the model generation module 500 may generate a Facebook-specific generative grammar model that reflects Facebook® users' typical messaging style of full grammatically correct sentences. In another example, upon analyzing social network activity from Twitter®, the model generation module 500 may determine that users of Twitter® typically use fragmented sentences when posting messages, and in turn, the model generation module 500 may generate a Twitter-specific generative grammar model that reflects Twitter® users' typical messaging style of fragmented sentences.

Consistent with some embodiments, the model generation module 500 may generate a generative grammar model that is specific to each user of the network-based content publisher 104. These user-specific generative grammar models may be based on each user's individual messaging style, which the model generation module 500 may learn through analysis of respective users' social network activity. The individual messaging style may be related to various elements such as use of full, run-on, or fragmentary sentences, hashtag use, punctuation, a font size, a font style, a diction choice, emoji use, message formality, a salutation, or various combinations thereof.

Consistent with some embodiments, the model generation module 500 may be configured to generate generative grammar models for creating messages that are related to a certain type of content or are for a particular purpose. As an example, the model generation module 500 may develop a generative grammar model for generating messages to share product listings with one or more other users for the purpose of advertising the offer to sell the product contained therein. In this example, the generative grammar model for advertising a product for sale may begin with a call to action by specifying that a first lexical slot included in the generative grammar model begin with a verb (e.g., "Buy it now!" or "Check this out!"). In another example, the model generation module 500 may develop a generative grammar model for generating messages to share product listings for the purpose of expressing an interest in the product offered for sale. In this example, the generative grammar model for generating a message to express interest in the product may specify that a first lexical slot included in the generative grammar model be constrained to an adjective so as to provide a more descriptive message about the product that would be more likely to be perceived by the viewing audience as an expression of interest.

The model repository 502, which in some embodiments resides on the database 122, stores the generative grammar models generated by the model generation module 500. As such, the model repository 502 includes a plurality of generative grammar models that are individually developed for a particular social network platform, a particular user, a particular content type (e.g., product listings), or a particular product (e.g., in instances in which the message is for the purpose of promoting or advertising a particular product). In some embodiments, the model repository 502 may store human-made generative grammar models that are created based on heuristics.

The request module 504 is configured to receive and process requests to generate messages for publication. In some embodiments, a received request to generate a message may be part of a request to share content with one or more users (also referred to herein as "recipients" or "recipient users"). Such requests may include an identifier of the content, a selected message delivery platform (e.g., email, SMS, or social network platform), and an identifier of one or more recipients (e.g., members of a social network of the sender). The identifier of the one or more recipients may include a name, an account number, a phone number, an email address, a user name, or any other identifier suitable for identifying a would-be recipient of a message. Consistent with some embodiments, the user requests may be received at a share widget embedded in or included with content published by the network-based content publisher 104.

The retrieval module 506 is responsible for accessing and retrieving generative grammar models (e.g., from the model repository 502) in response to receiving message generation requests. The particular generative grammar model accessed by the retrieval module 506 may depend on a particular social network platform to which the message is to be published, a user associated with the message generation request (e.g., the requesting user or one or more message recipients), a type of content which the message is being generated to share, a purpose for publishing the message (e.g., to advertise a product for sale), or any combination of these.

The retrieval module 506 may be further configured to access source data specified in generative grammar models, and extract terms from such data to be used in populating lexical slots comprising the generative grammar models. The retrieval module 506 may extract such terms in accordance with respective grammatical constraints specified for each lexical slot comprising a generative grammar model. The message generation module 508, which is responsible for generating messages using generative grammar models, may in turn use the extracted terms to populate the lexical slots to achieve the result of a complete generated message. In instances in which a message being generated by the message generation module 508 is to be used to share content with recipients, the message generation module 508 may further include a reference to content (e.g., a link) in the generated message.

The validation module 510 is responsible for validating the message generated by the message generation module 508. To this end, the validation module 510 may be configured to perform various validation routines to ensure that the generated message is understandable, logical, and consistent. In some embodiments, the validation of the message may include verifying that the generated message adheres to a messaging standard or constraint (e.g., related to length or content) imposed by the social network platform to which the message is to be published. In an example, the validation module 510 may verify that the message does not contain profanity or other words or phrases that may violate the terms of use of the social network platform to which the message is to be published. In some embodiments, the validation of the message may include requesting approval of the message from the requestor (e.g., by transmitting instructions to the client device 106 that cause the device to prompt the user for approval and receive input indicative of such).

The communication module 512 is responsible for publishing messages to users. In doing so, the communication module 512 may utilize any one of a number of message delivery networks and platforms to deliver messages to users. For example, the communication module 512 may deliver electronic mail (email), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

In some instances, users may request that content be shared using a particular social network platform. To this end, the communication module 512 is configured to facilitate publishing messages to social network platforms as social network entries. The communication module 512 may utilize a publicly available API provided by the applicable social network platform to pass information, including a message, to the social network platform, which ultimately publishes the message as a social network entry on behalf of the requestor.

Figure 6:
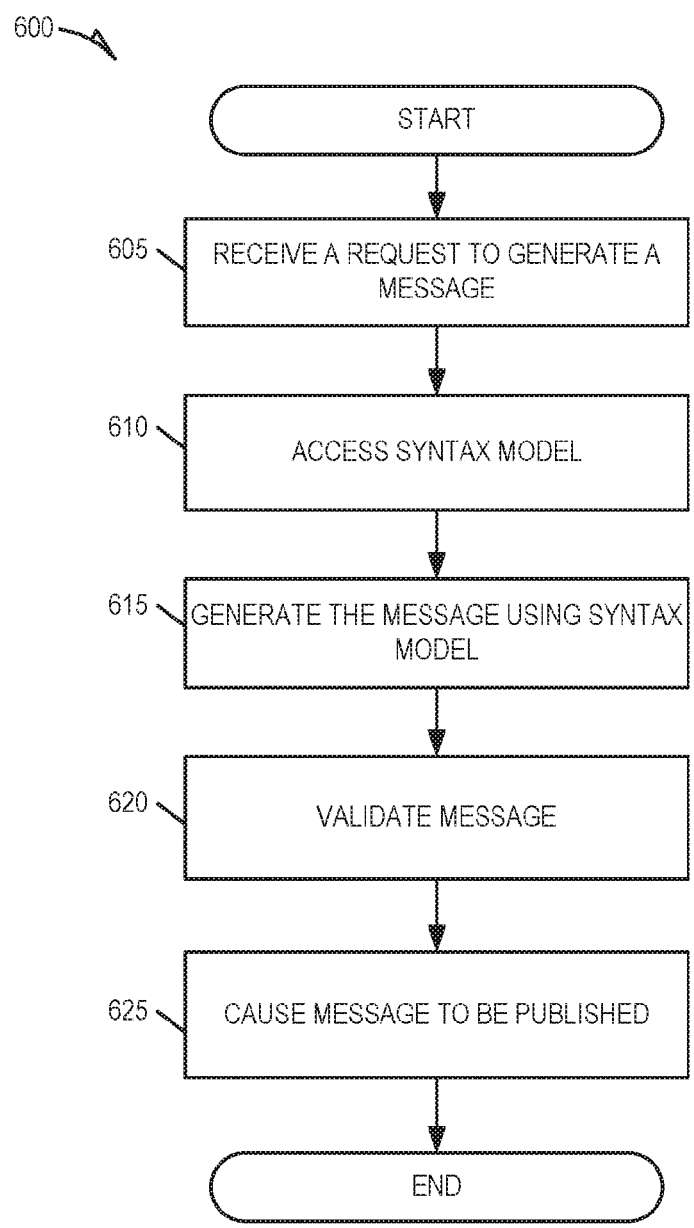
FIG. 6 is a flowchart illustrating a method for publishing a message, consistent with some embodiments.

FIG. 6 is a flowchart illustrating a method 600 for publishing a message, consistent with some embodiments. The method 600 may be embodied in computer-readable instructions for execution by one or more processors such that the steps of the method 600 may be performed in part or in whole by the application server 118. In particular, the method 600 may be carried out by the functional components of the generative grammar application 124, and accordingly, the method 600 is described below by way of example with reference thereto. However, it shall be appreciated that the method 600 may be deployed on various other hardware configurations and is not intended to be limited to the functional components of the generative grammar application 124.

At operation 605, the request module 504 receives a request to generate a message (e.g., from the client device 106). The request may specify one or more message platforms (e.g., email, text messaging, or a social network) to be utilized to publish the message. The request may be to generate a message that is to be published on behalf of the requestor, and the request may specify an intended audience (e.g., recipient users) to which the message is to be published. In some instances, the message to be generated is for the purpose of sharing, advertising, or promoting existing content such as a product listing offering a product for sale. In these instances, the request may be generated by the web client 110 or the application 112 executing on the client device 106 in response to user selection of a share widget included with the existing content.

At operation 610, the retrieval module 506 accesses a generative grammar model from the model repository 502 (e.g., maintained in the database 122). The generative grammar model accessed by the retrieval module 506 defines a message structure. As part of the message structure, the generative grammar model defines one or more lexical slots, which are blanks to be filled with a term extracted from respective data sources. The generative grammar model further specifies a corpus of source data and a grammatical constraint for each lexical slot included in the message structure. The particular generative grammar model accessed by the retrieval module 506 may be selected based on a social network platform to which the message may be published, the user requesting the generation of the message, a user or group of users who will receive or view the message, the type of content which the message is being generated to share, or a particular product for which the message will be used to share, sell, promote, or advertise. In an example, a user may use the client device 106 to request generation of a message to share content on Twitter, and in response, the retrieval module 506 accesses a generative grammar model developed for Twitter.

At operation 615, the message generation module 508 generates a message using the generative grammar model. The generating of the message by the message generation module 508 may include accessing a corpus of source data (e.g., specified by the generative grammar model) for each lexical slot, extracting a term from each corpus of source data in accordance with a corresponding grammatical constraint specified by the generative grammar model, and using the extracted terms to populate the lexical slots. In some embodiments, the generating of the message may further include appending a link or reference to existing content in the message. Additional details regarding the process of generating the message are discussed in reference to FIG. 7, consistent with some embodiments.

At operation 620, the validation module 510 validates the message generated by the message generation module 508. The validation module 510 may perform various validation routines to ensure that the generated message is understandable, logical, and consistent. In some embodiments, the validation of the message may include verifying that the generated message adheres to a messaging standard or constraint (e.g., related to length or content) imposed by the social network platform to which the message is to be published. In an example, the validation module 510 may verify that the message does not contain profanity or other words or phrases that may violate the terms of use of the social network platform to which the message is to be published. In some embodiments, the validation of the message may include requesting approval of the message from a user (e.g., by transmitting instructions to the client device 106 that cause the device to prompt the user for approval and receive input indicative of such) on whose behalf the message will be published or transmitted.

At operation 625, upon successful validation of the message, the communication module 512 may cause the message to be published. In some embodiments, the communication module 512 may cause the message to be published by the network-based content publisher 104 such that it may be viewed by other users of the network-based content publisher 104. In some embodiments, the communication module 512 may cause the message to be published directly to one or more recipient users (e.g., by transmitting the message as an SMS message to the devices of the one or more recipients). In some embodiments, the communication module 512 may cause the message to be published on a third-party platform that allows submissions of user generated content, such as, for example, a social network platform. In these embodiments, the communication module 512 may cause the message to be published by transmitting a request (e.g., an API call) to a server hosting the platform (e.g., the third party server 108 hosting the third party application 126) to publish the message.

Figure 7:
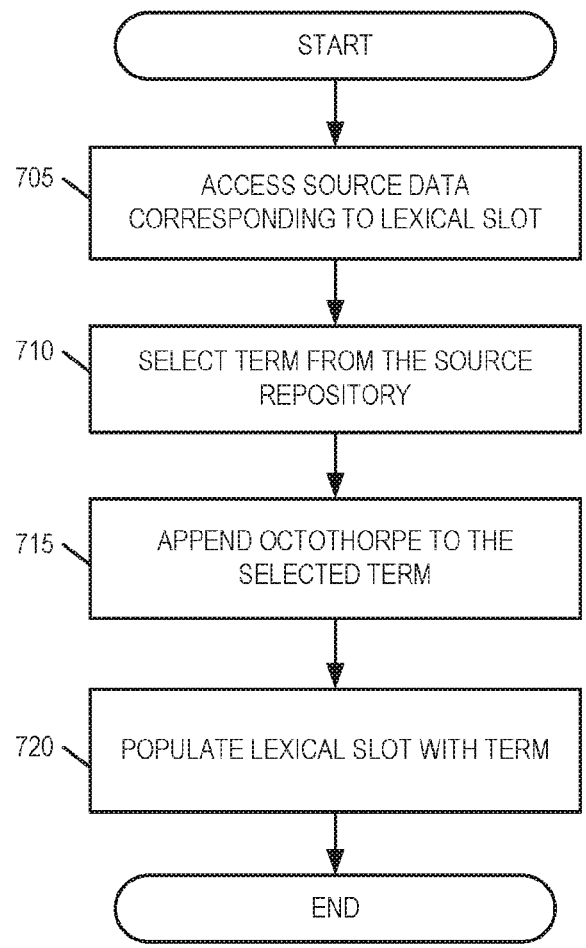
FIG. 7 is a flowchart illustrating a method for generating a message using a generative grammar model, consistent with some embodiments.

FIG. 7 is a flowchart illustrating a method 700 for generating a message using a generative grammar model, consistent with some embodiments. The method 700 may be embodied in computer-readable instructions for execution by one or more processors such that the steps of the method 700 may be performed in part or in whole by the application server 118. In particular, the method 700 may be carried out by the retrieval module 506 and the message generation module 508 of the generative grammar application 124, and accordingly, the method 700 is described below by way of example with reference thereto. However, it shall be appreciated that the method 700 may be deployed on various other hardware configurations and is not intended to be limited to the functional components of the generative grammar application 124.

Consistent with some embodiments, the method 700 may correspond to the operation 615 discussed in reference to FIG. 6. At operation 705, the retrieval module 506 accesses the corpus of source data specified by the generative grammar model for the lexical slot. At operation 710, the message generation module 508 selects a term (e.g., a word or phrase) from the source data. The term selected by the message generation module 508 is in accordance with the grammatical constraint for the lexical slot specified by the generative grammar model. In some embodiments, the corpus of source data may be organized in segmented categories that may correspond to various grammatical constraints. For example, the corpus of source data may be organized by lexical category such that nouns are aggregated into a first segment, verbs are aggregated into a second segment, adjectives into a third segment, and so on. In these embodiments, the message generation module 508 may select a term from within the category corresponding to the grammatical constraint specified (e.g., by the generative grammar model) for the lexical slot. In some embodiments, the corpus of source data may be a curated list of terms that are ranked, for example, according to social relevancy (e.g., trending terms). In these embodiments, the message generation module 508 may select one of the highest-ranked terms. In some embodiments, the message generation module 508 may analyze the corpus of data to identify terms that fulfill the grammatical constraint, and select one of the identified terms.

At operation 715, which is an optional operation performed in some embodiments, the message generation module 508 appends an octothorpe ("#") to the selected term to create a hashtag. In some embodiments, the corpus of source data includes hashtag terms, and such terms may be selected at operation 710. At operation 720, the message generation module 508 populates the lexical slot with the term (e.g., either the plain term or the hashtag). It shall be appreciated that the operations comprising the method 700 are performed for each lexical slot specified in a generative grammar model. In other words, the method 700 is iteratively performed until each lexical slot in the generative grammar model is filled with information to result in the generation of a complete message (e.g., the message 320).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Machine Architecture

Figure 8:
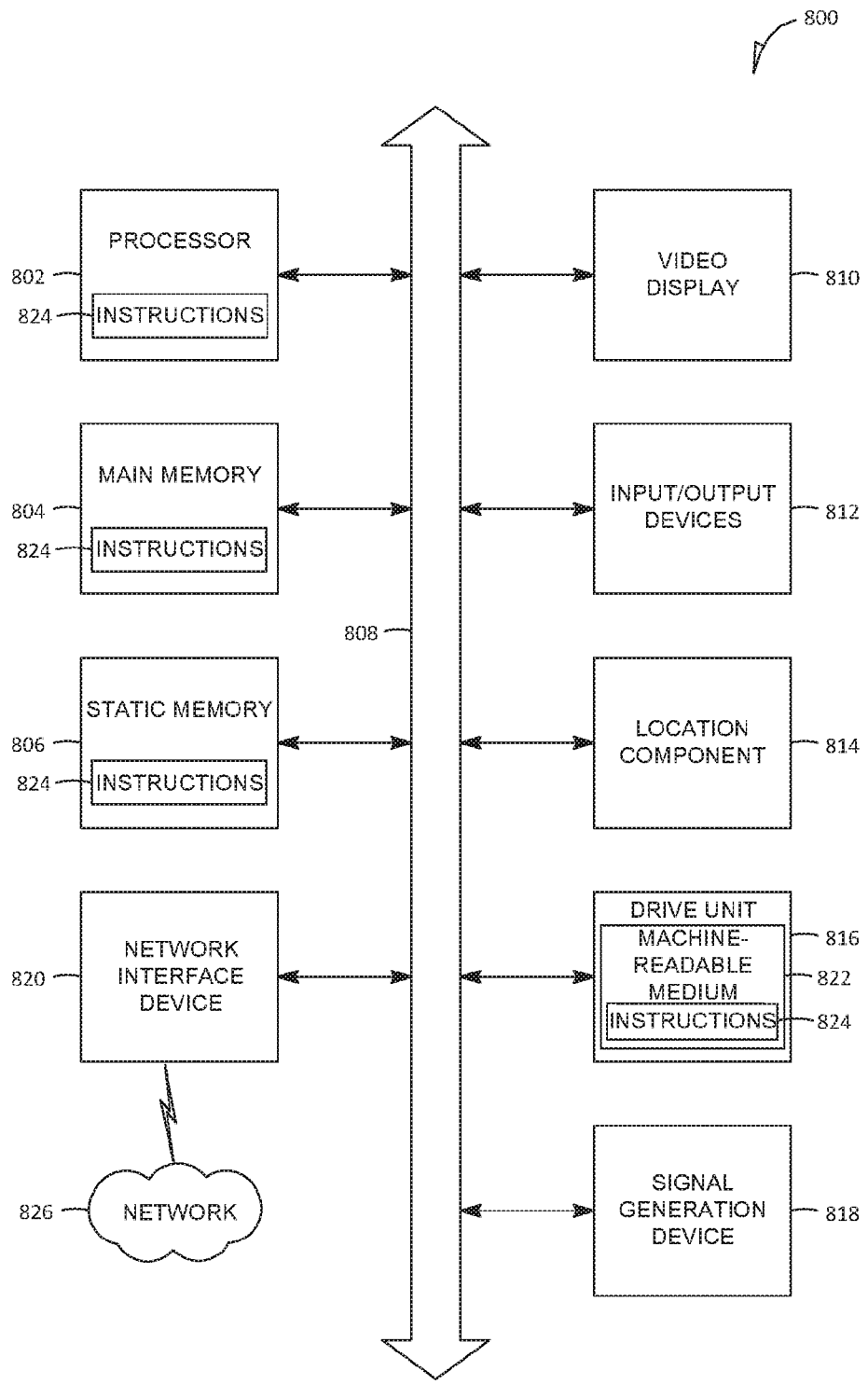
FIG. 8 is a diagrammatic representation of a machine in the example form of a computer system within which a set of instructions for causing the machine to perform any one or more of the methodologies discussed herein may be executed.

FIG. 8 is a diagrammatic representation of a machine in the example form of a computer system 800 within which a set of instructions for causing the machine to perform any one or more of the methodologies discussed herein may be executed. The computer system 800 may correspond to the client device 106, the third party server 108, the API server 114, the web server 116, or the application server 118, consistent with some embodiments. The computer system 800 may include instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a personal digital assistant (PDA), a cellular telephone, a smart phone (e.g., iPhone®), a tablet computer, a web appliance, a handheld computer, a desktop computer, a laptop or netbook, a set-top box (STB) such as those provided by cable or satellite content providers, a wearable computing device such as glasses or a wristwatch, a multimedia device embedded in an automobile, a Global Positioning System (GPS) device, a data enabled book reader, a video game system console, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display 810 (e.g., a liquid crystal display (LCD) or a cathode ray tube (CRT)). The computer system 800 also includes one or more input/output (I/O) devices 812, a location component 814, a drive unit 816, a signal generation device 818 (e.g., a speaker), and a network interface device 820. The I/O devices 812 may, for example, include a keyboard, a mouse, a keypad, a multi-touch surface (e.g., a touchscreen or track pad), a microphone, a camera, and the like.

The location component 814 may be used for determining a location of the computer system 800. In some embodiments, the location component 814 may correspond to a GPS transceiver that may make use of the network interface device 820 to communicate GPS signals with a GPS satellite. The location component 814 may also be configured to determine a location of the computer system 800 by using an Internet Protocol (IP) address lookup or by triangulating a position based on nearby mobile communications towers. The location component 814 may be further configured to store a user-defined location in the main memory 804 or the static memory 806. In some embodiments, a mobile location enabled application may work in conjunction with the location component 814 and the network interface device 820 to transmit the location of the computer system 800 to an application server or third party server for the purpose of identifying the location of a user operating the computer system 800.

In some embodiments, the network interface device 820 may correspond to a transceiver and antenna. The transceiver may be configured to both transmit and receive cellular network signals, wireless data signals, or other types of signals via the antenna, depending on the nature of the computer system 800.

Machine-Readable Medium

The drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, the static memory 806, and/or the processor 802 during execution thereof by the computer system 800, with the main memory 804, the static memory 806, and the processor 802 also constituting machine-readable media.

Consistent with some embodiments, the instructions 824 may relate to the operations of an operating system (OS). Depending on the particular type of the computer system 800, the OS may, for example, be the iOS® operating system, the Android® operating system, a BlackBerry® operating system, the Microsoft® Windows® Phone operating system, Symbian® OS, or webOS®. Further, the instructions 824 may relate to operations performed by applications (commonly known as "apps"), consistent with some embodiments. One example of such an application is a mobile browser application that displays content, such as a web page or a user interface using a browser.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding, or carrying instructions (e.g., the instructions 824) for execution by the machine and that cause the machine to perform any one or more of the methodologies of the present disclosure, or that is capable of storing, encoding, or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 824 may further be transmitted or received over a network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying the instructions 824 for execution by the machine, and includes digital or analog communications signals or other intangible media to facilitate communication of such software.

Although the embodiments of the present inventive subject matter have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced.

The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:
one or more processors of a machine; and
a machine-readable medium storing instructions that, when executed by the one or more processors, cause the machine to perform operations comprising:
receiving a request to generate a message;
selecting a generative grammar model from the plurality of generative grammar models in response to receiving the request, the generative grammar model defining a message structure for the requested message, the message structure including a plurality of lexical slots, the generative grammar model specifying:
a corpus of source data to populate each lexical slot in the plurality of lexical slots; and
a grammatical constraint for each lexical slot in the plurality of lexical slots;
generating the message using the generative grammar model; and
causing the message to be published on a content publishing platform.

2. The system of claim 1, wherein each of the plurality of lexical slots includes a blank in the message structure to be populated with information from the corresponding corpus of source data.

3. The system of claim 2, further comprising verifying that the message adheres to a particular messaging standard.

4. The system of claim 1, wherein the request specifies the content publishing platform for publishing the message, and wherein the generative grammar model is selected based on the content publishing platform specified in the request.

5. The system of claim 1, wherein the grammatical constraint for each lexical slot specifies a part of speech for a term to populate the lexical slot.

6. The system of claim 1, wherein the generating the message comprises:
for each lexical slot in the plurality of lexical slots:
accessing the corpus of source data corresponding to the lexical slot;
extracting a term from the corpus of source data in accordance with the grammatical constraint corresponding to the lexical slot; and
populating the lexical slot with the extracted term.

7. The system of claim 6, wherein at least one of the extracted terms is a hashtag.

8. A non-transitory machine-readable storage medium embodying instructions that, when executed by a machine, cause the machine to perform operations comprising:
receiving a request to generate a message;
selecting a generative grammar model from the plurality of generative grammar models in response to receiving the request, the generative grammar model defining a message structure for the requested message, the message structure including a plurality of lexical slots, the generative grammar model specifying:
a corpus of source data to populate each lexical slot in the plurality of lexical slots; and
a grammatical constraint for each lexical slot in the plurality of lexical slots;
generating, by a hardware processor, the message using the generative grammar model; and
causing the message to be published on a content publishing platform.

9. A method comprising:
receiving a request to generate a message;
selecting a generative grammar model from the plurality of generative grammar models in response to receiving the request, the generative grammar model defining a message structure for the requested message, the message structure including a plurality of lexical slots, the generative grammar model specifying:
a corpus of source data to populate each lexical slot in the plurality of lexical slots; and
a grammatical constraint for each lexical slot in the plurality of lexical slots;
generating, by a hardware processor, the message using the generative grammar model; and
causing the message to be published on a content publishing platform.

10. The method of claim 9, wherein the request to generate the message is generated as part of a request to share content received at a share widget presented in conjunction with the content.

11. The method of claim 9, wherein the generative grammar model is developed in accordance with messaging conventions specific to the content publishing platform.

12. The method of claim 9, wherein the generating of the message comprises:
for each lexical slot in the plurality of lexical slots:
accessing the corpus of source data corresponding to the lexical slot;
selecting a term from the corpus of source data in accordance with the grammatical constraint corresponding to the lexical slot; and
populating the lexical slot with the selected term.

13. The method of claim 12, wherein the grammatical constraint specifies a lexical category, and wherein the selected term corresponds to the lexical category.

14. The method of claim 12, wherein the generating of the message further comprises appending an octothorpe to the selected term prior to populating the lexical slot.

15. The method of claim 12, wherein the selecting of the term is based on trending information obtained from a social network platform.

16. The method of claim 9, wherein the generative grammar model is selected based on at least one of: the content publishing platform to which the message is to be published, a particular user who submitted the request, a potential viewing audience of the message, and content associated with the request.

17. The method of claim 9, wherein at least a portion of the lexical slots are prepopulated with terms.

18. The method of claim 9, wherein corpus of source data is organized in segmented into a plurality of categories, each category corresponding to one of a plurality of grammatical constraints.

19. The method of claim 9, wherein the generative grammar model corresponds to a user profile corresponding to a user of the client device from which the request is received.

20. The method of claim 9, further comprising verifying that the generated message adheres to a limitation imposed by the content publishing platform.

* * * * *

UNITED STATES PATENT AND TRADEMARK OFFICE
CERTIFICATE OF CORRECTION

| | | |
|---|---|---|
| PATENT NO. | : 10,073,841 B2 | Page 1 of 1 |
| APPLICATION NO. | : 15/595060 | |
| DATED | : September 11, 2018 | |
| INVENTOR(S) | : Elizabeth Churchill et al. | |

It is certified that error appears in the above-identified patent and that said Letters Patent is hereby corrected as shown below:

On the Title Page

Item (72), in Column 1, in "Inventors", Lines 2-3, delete "Moutain View," and insert -- Mountain View, --, therefor.

In the Specification

In Column 1, Line 8, Delete "Sep. 24, 2014," and insert -- Sep. 29, 2014, --, therefor.

Signed and Sealed this
Fifth Day of February, 2019

Andrei Iancu
*Director of the United States Patent and Trademark Office*